UNITED STATES PATENT OFFICE.

JOHN A. SCHAEFFER, OF JOPLIN, MISSOURI, AND JOHN R. MacGREGOR, OF CHICAGO, ILLINOIS, ASSIGNORS TO PICHER LEAD COMPANY, OF JOPLIN, MISSOURI, A CORPORATION OF MISSOURI.

METHOD OF MANUFACTURING LEAD CARBONATES.

1,203,911.     Specification of Letters Patent.     Patented Nov. 7, 1916.

No Drawing.     Application filed May 2, 1916. Serial No. 95,883.

*To all whom it may concern:*

Be it known that we, JOHN A. SCHAEFFER, residing in the city of Joplin, in the county of Jasper and State of Missouri, and JOHN R. MACGREGOR, residing in the city of Chicago, in the county of Cook and State of Illinois, both citizens of the United States of America, have invented certain new and useful Improvements in Methods of Manufacturing Lead Carbonates, of which the following is a true and exact description.

My invention relates to the manufacture of lead carbonates and particularly of the basic lead carbonate for use as a pigment, and it is based on my discovery that fumed litharge, the product made by converting litharge into a fume by heat, in admixture with water will be converted into lead carbonate, either basic or neutral in accordance with the length of the treatment, by treating the mixture with carbon dioxid gas, and on my further discovery that the process is greatly hastened by having acetic acid in solution in the water.

In carrying my process into effect in the best way known to me I triturate the fumed litharge with water to break up any lumps and I dilute the paste thus formed with water and I add acetic acid to the mixture in quantity of about ten per cent. of the litharge, which acid is of course dissolved in the water. I then pass a stream of purified carbon dioxid gas into the mixture, the gas being thoroughly distributed in the mixture by any convenient means. As a result of this treatment the color of the mixture, which is originally of a canary yellow color, changes gradually but promptly, first to lighter yellows and finally to a white which indicates that the lead oxid has been changed to basic carbonate of lead. While the change in color is taking place there is also a change in the physical structure of the material, the pigment in suspension becoming more flocculent and the mixture thicker. The pigment appears to be most flocculent when the basic lead carbonate formed corresponds to the formula $2PbCO_3.Pb(OH)_2$, which is the accepted formula for basic lead carbonate of best quality made by the old Dutch method, and I prefer to stop the treatment when this composition is attained, both because it is I believe the best for use as a pigment and also because it is advisable that the pigment should have the same oil requirement for grinding as the product made by the old Dutch process. The treatment with carbon dioxid gas can be continued with the result of forming less basic lead carbonates and finally a neutral carbonate, but I have found no advantage in continuing the treatment beyond the point indicated which can be ascertained roughly by the flocculence of the suspended pigment but preferably by testing samples as the treatment continues. After the reaction has continued until the desired composition of pigment is secured the supply of gas is stopped, the solid pigment is removed from the mother liquor, carefully washed and partially dried in a filter press. The resultant moist basic carbonate of lead is then ground in oil. The mother liquor I use and reuse in the treatment of further quantities of fumed litharge until it is used up. In practice I have used for my initial mixture 100 parts of fumed litharge to about 400 parts of water and 10 parts of acetic acid. Where acetic acid is used in solution in the water a cyclical reaction takes place and the production of the lead carbonate of desired composition is much more rapid than where no acid is used. The cyclical reaction I have referred to takes place in that the acetic acid combines with a portion of the fumed litharge forming a lead acetate which is promptly acted upon by the carbon dioxid, forming basic lead carbonate and liberating the acetic acid to act on further quantities of fumed litharge.

It will be understood that my process differs from other so called quick methods of making basic lead carbonate in that it starts with and operates upon a very reactive material, fumed litharge, which is held in suspension, not in solution in water. Where I use acetic acid in solution in the water there is of course a slight solution of the fumed litharge to permit the cyclical reaction to take place, but there is nothing comparable with the complete formation of lead acetate which is characteristic of the older quick processes.

Having now described my invention, what I claim as new and desire to secure by Letters Patent is,

1. The method of manufacturing lead carbonate which consists in mixing fumed litharge with water and treating the mixture with carbon dioxid gas.

2. The method of manufacturing lead carbonate which consists in mixing fumed litharge in water having acetic acid in solution and treating the mixture with carbon dioxid gas.

3. The method of manufacturing basic lead carbonate which consists in mixing fumed litharge in water having acetic acid in solution, treating the mixture with carbon dioxid gas and stopping the gas treatment when the basic lead carbonate formed has the desired composition.

JOHN A. SCHAEFFER.
JOHN R. MacGREGOR.